United States Patent [19]

Hilden

[11] Patent Number: 5,199,315
[45] Date of Patent: Apr. 6, 1993

[54] APPARATUS TO CONTROL THE MODULATION PRESSURE IN A FOURTH GEAR CLUTCH PACK

[76] Inventor: Daniel L. Hilden, 5025 Independence St., Maple Plain, Minn. 55359

[21] Appl. No.: 829,414

[22] Filed: Feb. 3, 1992

[51] Int. Cl.⁵ .............................................. F16H 59/00
[52] U.S. Cl. ..................................... 74/335; 192/3.58; 251/129.21
[58] Field of Search ............ 74/335; 192/109 F, 85 R, 192/3.58; 251/129.21

[56] References Cited

U.S. PATENT DOCUMENTS

| | | | |
|---|---|---|---|
| 4,416,358 | 11/1983 | Kapp | 192/3.58 X |
| 4,441,687 | 4/1984 | Pauliukonis | 251/129.21 |
| 4,564,046 | 1/1986 | Lungu | 251/129.21 X |
| 4,595,035 | 6/1986 | Warrick | 251/129.21 X |
| 4,674,613 | 6/1987 | Sikorski | 192/109 F X |
| 4,790,351 | 12/1988 | Kervagoret | 251/129.21 X |
| 4,859,005 | 8/1989 | Key et al. | 251/129.21 X |
| 4,998,559 | 3/1991 | McAuliffe, Jr. | 251/129.21 X |
| 5,027,846 | 7/1991 | Baron | 251/129.21 X |

FOREIGN PATENT DOCUMENTS

| | | | |
|---|---|---|---|
| 58-196378 | 11/1983 | Japan | 251/129.21 |
| 59-121275 | 7/1984 | Japan | 251/129.21 |

*Primary Examiner*—Leslie A. Braun
*Assistant Examiner*—Ryan W. Massey
*Attorney, Agent, or Firm*—David A. Lingbeck

[57] ABSTRACT

This invention is an apparatus to control the modulation pressure in a fourth gear clutch pack. This apparatus comprises a modulation solenoid having a passage extending therethrough, a throttle member having a longitudinal bore extending therethrough, a hollow cylindrical body, and a hole through a wall of the cylindrical body, and a seal member. This apparatus is mounted to a fourth gear valve body with the throttle member mountably engaged in an end bore of the fourth gear valve body. The modulation solenoid is mounted to an end wall of the fourth gear valve body, and the seal member is mountably engaged between the throttle member and the modulation solenoid to prevent fluid from leaking out between the modulation solenoid and the throttle member.

1 Claim, 2 Drawing Sheets

APPARATUS TO CONTROL THE MODULATION PRESSURE IN A FOURTH GEAR CLUTCH PACK

BACKGROUND OF THE INVENTION

This invention is an apparatus to control modulation pressure in a fourth gear clutch pack used on buses and other equipment. Modulation pressure in a fourth gear clutch pack increases to full pressure in fourth gear and decreases to minimum pressure in all lower gears because of how the flow of fluid out of the fourth gear clutch pack is regulated. In first, second, and third gears, the modulation pressure is at a low level which preferably ranges from 0.5 to 0.7 bars. In fourth gear, the modulation pressure is at fourth gear pressure which preferably ranges from 5 to 7 bars. Modulation pressure affects upshifting to fourth gear and downshifting from fourth gear. This pressure variation is necessary for the fourth gear clutch pack to operate and not burn out.

A review of the prior art does not suggest an apparatus to control the modulation pressure in a fourth gear clutch pack as described in the present invention.

One known prior art is a manual system, which operates off an internal cam, which in turn is moved by an external cable. The cam, when turned by an external cable, urges a spring-loaded valve into an end bore of the fourth gear valve body, closing off flow out of the fourth gear clutch pack and resulting in the pressure rising therein. This cable needs maintenance every 6,000 miles, which costs a minimum of $75,000 per 600 transmissions. This cable is difficult to adjuste and often sticks during the winter season because of freezing temperatures, ice, and snow.

Another known prior art is a system retrofitted by Renk Corporation. This system, like the present invention uses a solenoid to regulate the modulation pressure in a fourth gear clutch pack, but unlike the present invention, Renk uses the solenoid differently. In the retrofitted system, when the transmission downshifts from fourth gear, the solenoid is energized and moves an added valve member out of an end bore of a fourth gear valve body, thus permitting fluid to flow out of the fourth gear valve body and resulting in the modulation pressure dropping in the fourth gear clutch pack. Further, in the retrofitted system, if the solenoid fails or is not energized, a spring mounted to the valve member urges the valve member into the end bore, thus preventing fluid from discharging out of the fourth gear valve body and resulting in the modulation pressure rising. If this would happen when the transmission is in fourth gear, the vehicle could possibly jolt as the transmission is downshifted. This jolt could possible cause serious injury to people riding in the vehicle. They could be hurled forward through the front windshield if the driver of the vehicle stops quickly. This system also includes a diode and a relay system.

There is a definite need for an apparatus to control the modulation pressure in a fourth gear clutch pack which overcomes the problems associated with the known prior arts.

SUMMARY OF THE INVENTION

The present invention was previously filed in the U.S. Patent Office on Oct. 17, 1991 with the Ser. No. 07/778,504 and was subsequently abandoned.

The present invention relates to an apparatus for controlling the modulation pressure in a fourth gear clutch pack used on buses and other equipment. This invention includes a modulation solenoid which has a passage extending therethrough from an entrance end to an exit end, a mounting member for mounting the solenoid to an end wall of a fourth gear valve body, and a means for regulating flow of fluid out of a fourth gear valve body through the passage. This regulating means comprised and internal valve member, a seat, and a spring. This solenoid is conventional, especially in the mass transit industry, and has been used in other capacities.

This invention also includes a throttle member having a hollow cylindrical metallic body, a longitudinal bore extending therethrough from a front end to a back end, a hole extending through the wall of the hollow cylindrical body into the longitudinal bore for throttling flow of fluid through the longitudinal bore into a transverse bore of the fourth gear valve body, and a shoulder forming the back end of the throttle member. Further, this invention includes a seal member mountably engaged between the throttle member and the modulation solenoid to prevent fluid from leaking out between the modulation solenoid and the throttle member.

This apparatus is securably mounted to the fourth gear valve body. The front end of the throttle member extends into an end bore of the fourth gear valve body, which extends through an end wall of the fourth gear valve body to a modulation valve, and the hollow cylindrical metallic body is engaged in the end bore. The modulation solenoid is mounted to an end wall of the fourth gear valve body with the passage through the modulation solenoid being substantially in alignment with the longitudinal bore. Fluid discharging out of the fourth gear valve body through the end bore and through the passage flows through the longitudinal bore.

To receive fourth gear modulation pressure in the fourth gear clutch pack, the means for regulating flow of fluid through the passage is actuated and closes the passage, thus preventing fluid from discharging out of the fourth gear valve body through the modulation solenoid and resulting in the modulation pressure in the fourth gear clutch pack rising to fourth gear levels. The hole through the wall of the cylindrical body regulates the modulation pressure at fourth gear levels. To drop the modulation pressure below fourth gear level or to minimum pressure in the fourth gear clutch pack, the means for regulating the flow of fluid through the passage is actuated and opens the passage, thus permitting fluid to discharge out of the fourth gear valve body through the end bore and through the passage which results in the modulation pressure dropping to third gear levels or to minimum modulation pressure.

It is the object of this invention to produce an apparatus which superbly controls the modulation pressure in a fourth gear clutch pack. Unlike the solenoid in the retrofitted system used by Renk, the modulation solenoid does not actuate an added valve member to regulate the discharge of fluid out of the fourth gear valve body. Further, there are no such valve members to get stuck or to adjust.

Another object of this invention is to produce an apparatus which controls the modulation pressure in a fourth gear clutch pack that is fail safe. If the modulation solenoid fails or is not energized when the transmission is in a gear lower than fourth, the transmission will not upshift to fourth gear, and the regulating means will not close the passage. Fluid will continue to discharge out of the fourth gear valve body through the end bore, and the modulation pressure in the fourth gear clutch pack will not rise to fourth gear levels. However, if the modulation solenoid fails when the transmission is in fourth gear, the regulating means will open the passage. The modulation pressure will drop to third gear levels, the vehicle will not suffer a downshift jolt, and the fourth gear clutch pack will not burn out as the transmission downshifts from fourth gear.

Yet another object of the present invention is to produce an apparatus which controls the modulation pressure in a fourth gear clutch pack that is virtually maintenance free except for the rare event of having to replace a failed modulation solenoid.

BRIEF DESCRIPTION OF THE DRAWINGS

These and other objects will be readily evident upon a study of the accompanying drawings wherein.

DETAILED DESCRIPTION OF THE INVENTION

Figure 1:
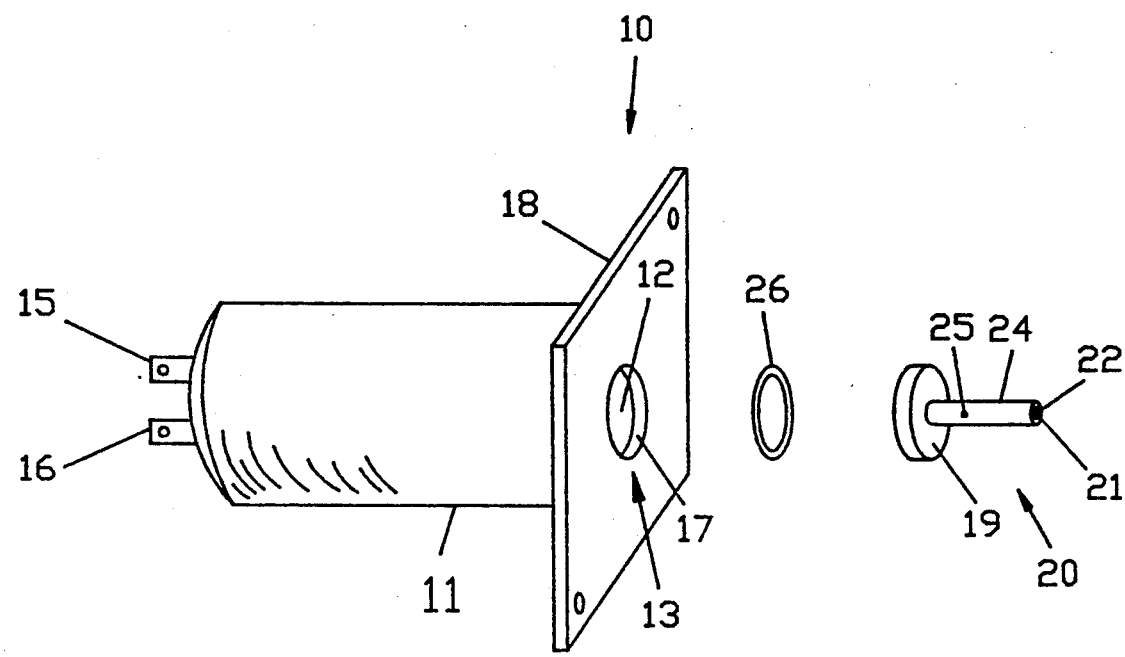
FIG. 1 is an exploded view of the apparatus to control the modulation pressure in a fourth gear clutch pack.
Figure 2:
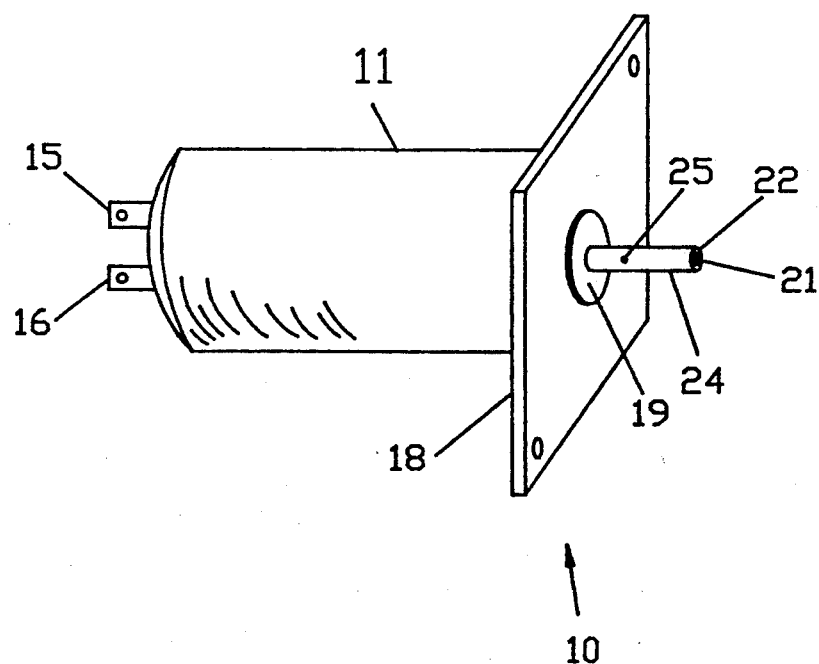
FIG. 2 is an assembled view of the apparatus to control the modulation pressure in a fourth gear clutch pack.
Figure 3:
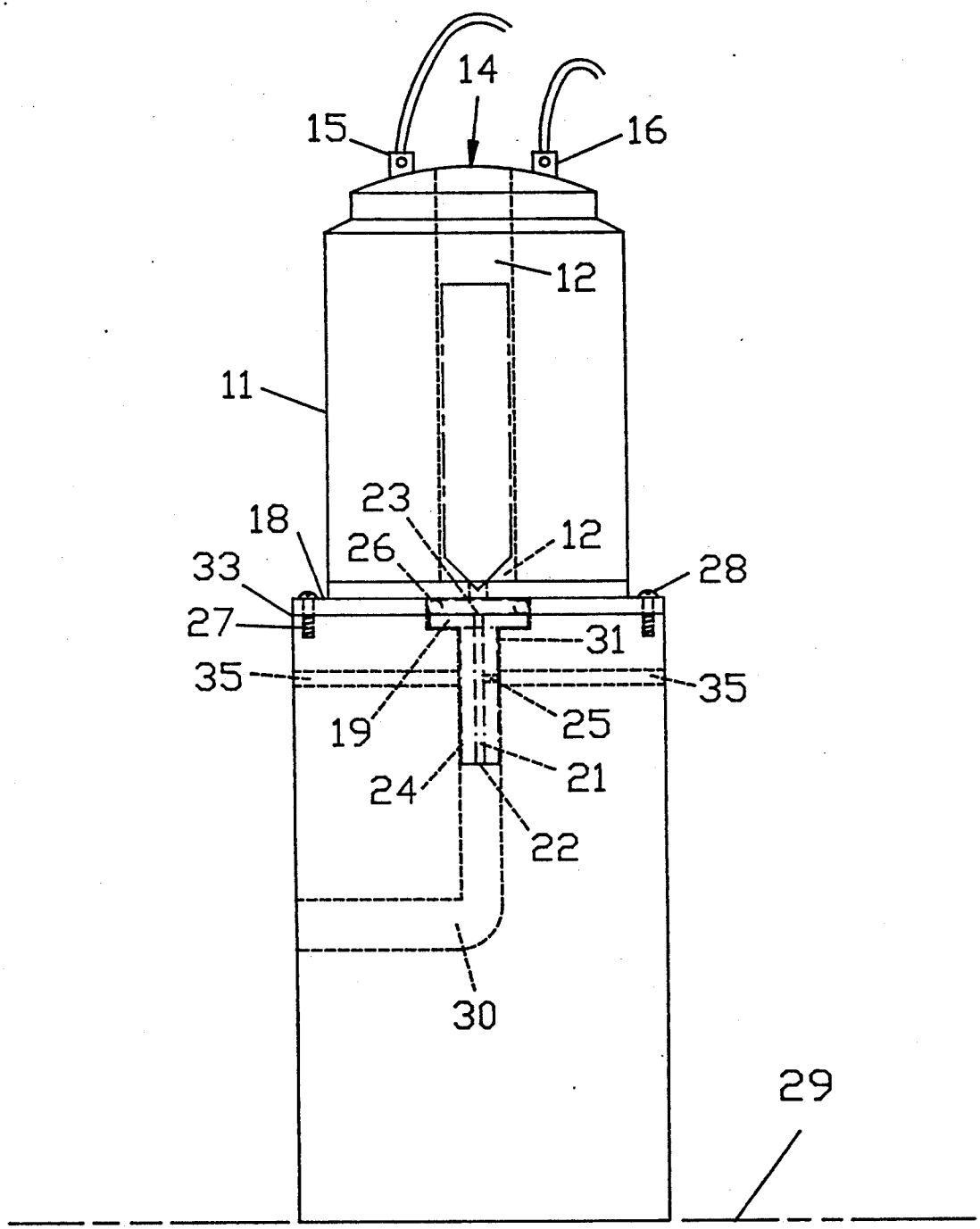
FIG. 3 is a cross-sectional view of a partial fourth gear valve body with a view of an assembled apparatus to control the modulation pressure in a fourth gear clutch pack, mounted to the fourth gear valve body.

Referring to the drawings in detail, more particularly to FIGS. 1, 2, and 3, the reference numeral 10 represents an apparatus to control the modulation pressure in a fourth gear clutch pack, which comprises a modulation solenoid 11, a throttle member 20, and a seal member 26.

The modulation solenoid 11 has a passage 12 extending therethrough from an entrance end 13 to an exit end 14 and a mounting member 18 at the entrance end 13. Also, the modulation solenoid 11 has a means for regulating flow of fluid through the passage 12, which is not shown in the drawings because this regulating means is conventional to all such solenoids. This regulating means comprises an internal valve member, a seat, and a spring. FIG. 1 shows a modulation solenoids 11 having a circular recess 17 in the entrance end 13. FIG. 1, further, shows the passage 12 extending through a central portion of the circular recess 17. FIG. 3 shows the modulation solenoid 11 securably mounted to the end wall 33 of the fourth gear valve body 29 with a pair of screws 27 and 28. To mount the modulation solenoid 11 to the end wall 33 using the pair of screws 27 and 28, two holes should be tapped and drilled into the end wall 33. The modulation solenoid 11 is wired to a control unit which is not shown in the drawings, and wired in series to a fourth gear solenoid also not shown in the drawings. The modulation solenoid 11 is a conventional device and may be the same solenoid as a fourth gear solenoid.

The throttle member 20 has a hollow substantially cylindrical metallic body 24, a longitudinal bore 21 extending therethrough from a front end 22 to a back end 23, a hole 25 extending through a wall of the cylindrical metallic body 24 into the longitudinal bore 21, and a shoulder 19 integrally formed with the cylindrical body 24 at the back end 23. The hole 25 is drilled through the wall of the cylindrical body 24 and should preferably have a diameter of about 0.026 inch. The front end 22 of the throttle member 20 is inserted into the end bore 31 of the fourth gear valve body 29. FIG. 3 shows the front end 22 of the throttle member 20 extending inwardly into an end bore 31 of the fourth gear valve body 29 with the shoulder 19 engaging the end wall 33 of the fourth gear valve body 29. The end bore 31 extends through the end wall 33 of the fourth gear valve body 29 to a modulation valve 30 in the fourth gear valve body 29.

FIG. 3 shows the cylindrical metallic body 24 engaged in the end bore 31. The throttle member 20 intersects a transverse bore 35 of the fourth gear valve body 29. The transverse bore 35 transverses the end bore 31. The longitudinal axis of the throttle member 20 is substantially perpendicular to the longitudinal axis of the transverse bore 35. The hole 25 should be substantially in alignment with the transverse bore 35. The hole 25 throttles the flow of fluid into the transverse bore 35. Further, the hole 25 is designed to regulate the modulation pressure at fourth gear levels so that when the modulation solenoid 11 is energized, the passage 12 through the modulation solenoid 11 is closed, preventing fluid from discharging out of the fourth gear valve body 29 through the end bore 31, through the longitudinal bore 21, and through the passage 12. The modulation pressure in the fourth gear clutch pack increases to maximum pressure as a result. The hole 25 extending through the cylindrical body 24 regulates the modulation pressure 5 to 7 bars by throttling the discharge of fluid through the longitudinal bore 21 and through the hole 25 into the transverse bore 35.

The throttle member 20 may be made from a rivet. The length of the rivet should be long enough so that the rivet intersects the transverse bore 35. A hole 25 is drilled through the body of the rivet and should be positioned along the rivet body so that the hole 25 will be substantially in alignment with the transverse bore 35 when the rivet is positioned in the end bore 31. The rivet is forcefully inserted into the end bore 31, and much of the end of the rivet sticking out of the end bore 31 is spread thus forming the shoulder. The rivet has a central core which is removed, thus forming the longitudinal bore 21 through the rivet.

FIGS. 2 and 3 show the seal member 26 mounted in the circular recess 17 at the entrance end 13 of the modulation solenoid 11 and engaging the back end 23 of the throttle member 20 to prevent fluid from leaking out between the modulation solenoid 11 and the throttle member 20. The seal member 26 has an opening therethrough. The opening is substantially in alignment with the passage 12 and the longitudinal bore 21. The seal member may be an O-ring.

FIG. 3 shows the modulation solenoid 11 securably mounted to the end wall 33 of the fourth gear valve body 29 with the passage 12 being substantially in alignment with the longitudinal bore 21.

A control unit controls the operation of the modulation solenoid. The control unit senses from the revolutions per minute of the drive shaft on the vehicle when to turn on fourth gear, and immediately prior to or during turning on fourth gear, the control unit energizes the modulation solenoid 11. The internal valve member slides into the seat in the passage 12 and closes the passage 12, preventing fluid from discharging out of the fourth gear valve body 29 through the end bore 31 and through the passage 12 and resulting in the modulation pressure in the fourth gear clutch pack rising to fourth gear modulation pressure or to maximum pressure. The hole 25 regulates the modulation pressure at fourth gear levels by throttling the discharge of fluid into the transverse bore 35. The control unit also senses from the revolutions per minute of the drive shaft when to turn off fourth gear, and immediately prior to or during turning off fourth gear, the control unit disconnects the energy to the modulation solenoid 11. The spring in the modulation solenoid 11 urges the internal valve member out of the seat, thus opening the passage 12, permitting fluid to discharge out of the fourth gear valve body 29 through the passage 12, and resulting in the modulation pressure falling to third gear levels or to minimum pressure in the fourth gear clutch pack.

If either the modulation solenoid 11 or a fourth gear solenoid fails or both fail before fourth gear is turned on, the regulating means of the modulation solenoid 11 will not close the passage 12. Fluid will continue to discharge out of the fourth gear valve body 29 through the passage 12, and fourth gear can be locked out. Also, if either or both solenoids fail when the transmission is in fourth gear, the regulating means opens the passage 12 and permits fluid to discharge out of the fourth gear valve body 29 through the passage 12, resulting in the modulation pressure dropping to third gear levels or to minimum pressure in the fourth gear clutch pack.

It is understood that the above description of the present invention is susceptible to various modifications, changes, and adaptations.

What is claimed is:

1. An apparatus to control the modulation pressure in a fourth gear clutch pack, which comprises:

a throttle member having a longitudinal bore extending therethrough from a front end to a back end, a hole extending through a wall thereof into said longitudinal bore, and a shoulder at said back end, said front end extending into an end bore of a fourth gear valve body with said hollow cylindrical body engaged in said end bore and with said shoulder engaging an end wall of said fourth gear valve body;

a modulation solenoid having a passage extending therethrough from an entrance end to an exit end, said modulation solenoid securably mounted to said end wall of said fourth gear valve body with said passage being substantially in alignment with said longitudinal bore, said modulation solenoid having a means for regulating discharge of fluid out of said fourth gear valve body through said end bore and through said passage so that (1) for fourth gear modulation pressure in said fourth gear clutch pack, said modulation solenoid is energized by a control unit and said regulating means closes said passage, preventing fluid from discharging out of said fourth gear valve body through said passage; and (2) for minimum modulation pressure in said fourth gear clutch pack, said modulation solenoid is not energized by said control unit and said regulating means opens said passage, permitting discharge of fluid out of said fourth gear valve body through said longitudinal bore and through said passage; and a seal member having an opening therethrough, said seal member mountably engaged at said entrance end of said solenoid and at said back end of said throttle member to prevent fluid from leaking out between said modulation solenoid and said throttle member, said opening being substantially in alignment with said passage and longitudinal bore.

* * * * *